(12) United States Patent
Bensberg et al.

(10) Patent No.: US 10,185,744 B2
(45) Date of Patent: Jan. 22, 2019

(54) CACHING VIEWS ON HISTORICAL DATA

(71) Applicant: SAP SE, Walldorf (DE)

(72) Inventors: Christian Bensberg, Heidelberg (DE); Norman May, Karlsruhe (DE); Sung Heun Wi, Gyeonggi-do (KR); Sang Il Song, Seoul (KR); Christian Kraus, Mannheim (DE)

(73) Assignee: SAP SE, Walldorf (DE)

( * ) Notice: Subject to any disclaimer, the term of this patent is extended or adjusted under 35 U.S.C. 154(b) by 677 days.

(21) Appl. No.: 14/747,767

(22) Filed: Jun. 23, 2015

(65) Prior Publication Data

US 2016/0378826 A1    Dec. 29, 2016

(51) Int. Cl.
*G06F 17/30* (2006.01)

(52) U.S. Cl.
CPC .... *G06F 17/30457* (2013.01); *G06F 17/3048* (2013.01)

(58) Field of Classification Search
CPC ........... G06F 17/3038; G06F 17/30457; G06F 17/3048
See application file for complete search history.

(56) References Cited

U.S. PATENT DOCUMENTS

| | | | | |
|---|---|---|---|---|
| 2004/0267824 | A1* | 12/2004 | Pizzo | G06F 17/30902 |
| 2011/0153958 | A1* | 6/2011 | Lee | 711/147 |
| 2011/0264650 | A1* | 10/2011 | Tobin | G06F 17/30554 707/722 |
| 2014/0310232 | A1* | 10/2014 | Plattner | G06F 17/3048 707/602 |
| 2015/0089134 | A1* | 3/2015 | Mukherjee | G06F 15/78 711/114 |
| 2015/0120656 | A1* | 4/2015 | Ramnarayanan | G06F 17/30129 707/616 |

OTHER PUBLICATIONS

VLDB and Partitioning Guide, Oracle Database VLDB and Partitioning Guide, 11g Release 1 (11.1), Jul. 2007, 216 pages.
SAP HANA Administration Guide, SAP HANA Platform SPS 09, Document Version: 1.1—Feb. 16, 2015, 838 pages.
SAP HANA SQL and System Views Reference, SAP HANA Platform SPS 09, Document Version: 1.0—Feb. 16, 2015, 1108 pages.

* cited by examiner

*Primary Examiner* — Cam Y T Truong
(74) *Attorney, Agent, or Firm* — Fish & Richardson P.C.

(57) ABSTRACT

In a general aspect, a computer-implemented method for executing a query on a table of a database, where the table has multiple partitions, can include receiving a query requesting a view on the table. The view on the table can be based on data included in a partition of the multiple partitions of the table. The method can also include determining a cached result to the query is not available in the database and generating a result to the query from, at least, the data of the partition of the multiple partitions. After the generating, the method can include building a cache including the result to the query, associating a transaction identifier for the query with the result to the query result in the cache; and returning the result to the query.

12 Claims, 7 Drawing Sheets

CACHING VIEWS ON HISTORICAL DATA

TECHNICAL FIELD

This description relates to caching aggregation views on historical data. More specifically, this description relates to caching view results on partitioned tables with one or more historical partitions, so as to avoid aggregation of the actual data.

BACKGROUND

In certain database applications, aggregates of historical data can be required (e.g., in response to queries on a table (or tables) of a database). For example, a sum of financial data for previous years may be requested on a database table that is partitioned by calendar year. Persistently storing such aggregates of historical data may be an inefficient use of memory in a databases (e.g., in an in-memory database), and can require complex logic to implement. A significant effort may be needed for application developers to modify such logic, thus reducing their flexibility to add new features to a given product. However, if aggregates of historical data are not persistently stored, they would then have to be computed "on the fly" (e.g., when they are requested). Such computing of historical data aggregates on the fly can require loading respective data (e.g., historical partition data) from disk each time a given aggregate (or view including that aggregate) is requested. Such an approach can also be an inefficient use of database resources (e.g., repeated loading of historical partitions from disk).

SUMMARY

According to a general aspect, a computer-implemented method for executing a query on a table of a database, where the table has multiple partitions, can include receiving a query requesting a view on the table, the view on the table being based on data included in a partition of the multiple partitions of the table. The method can also include determining a cached result to the query is not available in the database and generating a result to the query from, at least, the data of the partition of the multiple partitions. After generating the result to the query, the method can further include building a cache including the result to the query, associating a transaction identifier for the query with the result to the query in the cache and returning the result to the query.

Implementations may include one or more of the following features. For example, the partition of the multiple partitions of the table can include a historical partition. The query can be a first query, and the method can include receiving a second query requesting the view on the table, obtaining the result to the first query from the cache and returning the result to the first query obtained from the cache in response to the second query. Prior to obtaining the result to the first query from the cache, the method can include comparing the transaction identifier for the second query with a transaction identifier corresponding with a last update to the partition of the multiple partitions and determining that the transaction identifier for the second query is greater than or equal to the transaction identifier corresponding with the last update to the partition of the multiple partitions.

The query can be a first query and the method can include: receiving a statement including a request to update the partition of the multiple partitions; updating the partition of the multiple partitions in accordance with the statement; generating a partition update record including a transaction identifier of the statement, the transaction identifier of the statement being greater than the transaction identifier of the first query; and receiving a second query requesting the view on the table. In response to the second query, the method can include comparing the transaction identifier of the statement with the transaction identifier of the first query. In response to the comparing, the method can include: invalidating the result to the first query in the cache; generating a result to the second query from the data of the partition of the multiple partitions; including the result to the second query result in the cache; associating a transaction identifier of the second query with the result to the second query in the cache; and returning the result to the second query. The method can include receiving a third query requesting the view on the table. In response to the third query, the method can include comparing the transaction identifier of the second query with the transaction identifier of the statement. In response to the comparing, the method can include returning the result to the second query from the cache in response to the third query The database can include an in-memory database. The partition of the multiple partitions can be stored on disk-based storage. Generating the result to the query can include loading the partition of the multiple partitions from the disk-based storage into the in-memory database.

In another general aspect, a computer-implemented method for executing queries on a table of a database, where the table has multiple partitions, can include building a first cache entry, the first cache entry including a first query result of a view on the table and a first transaction identifier corresponding with the building of the first cache entry, the first cache entry being based on data of a first partition of the multiple partitions. The method can also include building a second cache entry, the second cache entry including a second query result of the view on the table and a second transaction identifier corresponding with the building of the second cache entry, the second cache entry being based on data of a second partition of the multiple partitions. After building the first cache entry, the method can include: receiving a statement including a request to update the first partition and generating a partition update record including a third transaction identifier corresponding with the statement, the third transaction identifier being greater than the first transaction identifier; receiving a query including a request for the first query result; and comparing the first transaction identifier with the third transaction identifier. In response to the comparing, the method can include invalidating and rebuilding the first cache entry including a regenerated first query result. The method can further include returning a response to the query including the regenerated first query result.

Implementations may include one or more of the following features. For example, the first partition can include a first historical partition and the second partition can include a second historical partition. The query can be a first query, and the method can include: receiving a second query including a request for the second query result; comparing the second transaction identifier with a fourth transaction identifier corresponding with a most recent modification of the second partition, the fourth transaction identifier being less than the second transaction identifier; and, in response to the comparing the second transaction identifier to the fourth transaction identifier, returning a response to the second query including the second query result from the second cache entry.

The database can include an in-memory database. The first partition and the second partition can be stored on disk-based storage. Generating the first query result of the first cache entry can include loading the first partition into the in-memory database. Generating the second query result of the second cache entry can include loading the second partition into the in-memory database. Generating the regenerated first query result of the rebuilt first cache entry can include reloading the modified first partition into the in-memory database.

In another general aspect, a system for executing queries on one or more database tables can include a database including a table having multiple partitions. The database can further include memory modules storing one or more of the multiple partitions of the table, a disk-based storage device storing one or more of the multiple partitions of the table and a query processor. The query processor can be configured to build a first cache entry and a second cache entry. The first cache entry can include a first query result of a view on the table and a first transaction identifier corresponding with the building of the first cache entry. The first cache entry can be based on data of a first partition of the multiple partitions. The second cache entry can include a second query result of the view on the table and a second transaction identifier corresponding with the building of the second cache entry. The second cache entry can be based on data of a second partition of the multiple partitions.

The system can also comprise a data manipulation language (DML) processor that is configured to, after the query processor builds the first cache entry, receive a statement including a request to update the first partition and generate a partition update record including a third transaction identifier corresponding with the statement, the third transaction identifier being greater than the first transaction identifier. The query processor can be further configured to receive a query including a request for the first query result and compare the first transaction identifier with the third transaction identifier. In response to the comparing, the query processor can be configured to invalidate and rebuild the first cache entry including a regenerated first query result and return a response to the query including the regenerated first query result.

Implementations may include one or more of the following features. For example, the first partition can include a first historical partition and the second partition can include a second historical partition. The query can being a first query, and the query processor can be configured to: receive a second query including a request for the second query result; compare the second transaction identifier with a fourth transaction identifier corresponding with a most recent modification of the second partition, the fourth transaction identifier being less than the second transaction identifier; and, in response to the comparing the second transaction identifier to the fourth transaction identifier, return a response to the second query including the second query result from the second cache entry.

The database can include an in-memory database. The first partition and the second partition can be stored on the disk-based storage device. Generating the first query result of the first cache entry can include loading the first partition into the in-memory database. Generating the second query result of the second cache entry can include loading the second partition into the in-memory database. Generating the regenerated first query result of the rebuilt first cache entry can include reloading the modified first partition into the in-memory database.

The query processor can include an SQL processor. The query processor and the DML processor can be included in a single processor. The single processor can include an SQL processor.

The details of one or more implementations are set forth in the accompanying drawings and the description below. Other features will be apparent from the description and drawings, and from the claims.

DETAILED DESCRIPTION

Figure 1:
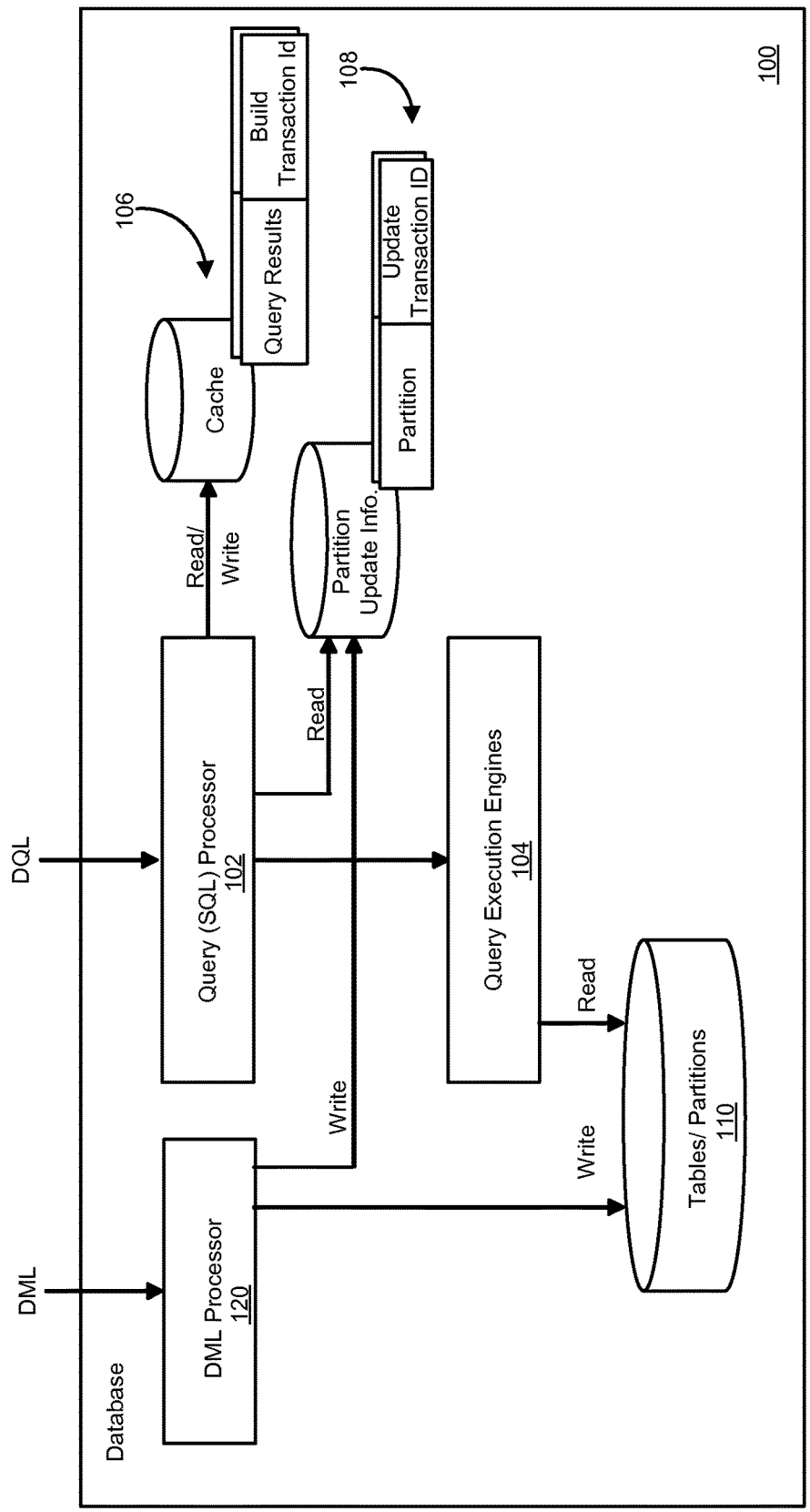
FIG. 1 is a block diagram of a database, according to an implementation.

FIG. 1 is a block diagram of a database 100, according to an implementation. The database 100 includes a query processor 102, query execution engines 104, a cache 106 (which may also be referred to as a view cache, an aggregate cache, or a transactional cache), partition update information 108, multiple tables/partitions (hereafter "tables") 110 and a data manipulation language (DML) processor 120. The DML can also be referred to as data modifying language, or other appropriate terms. The DML processor 120, in the database 100, can be configured to implement (execute) statements (e.g., SQL statements) that modify data in the tables/partitions 110 (e.g., current and/or historical partitions, un-partitioned tables, etc.). In some implementations, the query processor 102 and the DML processor 120 can be implemented as a single processor, e.g., an SQL processor.

The database 100 contains data stored in the tables 110. In one example implementation, the database 100 may include an in-memory database. The database 100 receives prepared calls, statements or queries at the query processor 102 or the DML processor 120 of the database 100. Such queries, calls or statements can be used to perform a number of operations on the database 100, such as retrieving data, modifying data, removing data, adding data, creating partitions and/or removing partitions, among other possible operations.

In one example implementation, the query processor 102 and/or the DML processor 120 may include an SQL processor. In this example, queries, calls and statements received by the SQL processor may be in the form of SQL statements. Other types of query and DML processors may be implemented as part of the database 100 and different query, call and/or statement strings or formats may be used, as appropriate, based on the type of query processor 102 and/or DML processor 120 being implemented.

The tables 110 may be non-partitioned and/or partitioned. Data in the tables 110 may be stored across multiple partitions. In certain implementations, data for a partitioned table of the tables 110 may be stored in a "current" partition and in one or more "historical" partitions. For instance, such a partitioned table may be organized by calendar year, where data objects for (corresponding with) a current calendar year are included in the current partition, while data objects for (corresponding with) previous calendar years are included, after being moved from the current partition, in respective historical partitions. In such an approach, each data object (data record) in the partitioned table can have respective age information associated with it. Age information can also be referred to as temperature information (e.g., implementing a "multi-temperature concept"). For example, the youngest data object in a table can be considered to be the "hottest" data object, while the oldest data object in the table can be considered to be the "coldest" data object. In other implementations, the range boundaries for current and historical partitions can be based on other criteria.

In the above example, the age (temperature) information for each data object can be included in the respective data object (e.g., a date a sales order was closed). Further, each partition (current and historical) may have a date range associated with it. For instance, a calendar year 2014 historical partition may have a data range of Jan. 1, 2014 through Dec. 31, 2014 associated with it. Such a date range (or other range values) can be assigned at the time a partition is created, or can be modified, as appropriate for the specific implementation. In this example, during the calendar year 2015, the current partition can have a date range of dates greater than Dec. 31, 2014.

A process referred to as an "aging run" can be periodically performed on the current partition to move data objects from the current partition to appropriate historical partitions. For instance, during an aging run, a data object in the current partition with corresponding age (temperature) information that falls within the date range of Jan. 1, 2014 through Dec. 31, 2014 can be moved to the calendar year 2014 historical partition during the aging run. In certain implementations, object that are open (active) may not be moved as part of an aging run, even if their age information indicates they should be moved from a current partition to a historical partition.

In approaches that implement a partitioned table using a current partition and one or more historical partitions (e.g., where data objects are moved to the historical partitions based on date (age) information of data objects in the table, such as described above), data objects that reside in older partitions may not be modified very often. For instance, during the calendar year 2015, it is unlikely that data objects contained in a calendar year 2010 partition would be modified, or that the calendar year 2010 historical partition would be modified by adding additional data objects during an aging run. Further, in implementations of the database 100 that include an in-memory database, it is desirable, for efficiency reasons and for purposes of reducing a cost of memory modules used to implement in the in-memory database, to only have data loaded in the in-memory database that is frequently accessed, modified, added to, etc. (e.g., a current partition).

However, in certain database applications (e.g., using certain views of the database), aggregates (e.g., aggregate values) of data included in the historical partitions may be needed on a recurring basis. Such aggregates (values) can be summaries of data included in a given partition (historical partition), such as sum, a minimum or a maximum of a set of data values included a single column of the given partition. As an example, a yearly sales revenue aggregate value for a calendar year 2010 could be determined by computing a sum of a column of weekly sales revenue values included in the calendar year 2010 historical partition. However, in order to compute aggregates for historical data partitions, e.g., when requested by a query (DQL), the database 100 would, in this example, either have to load the historical data partition(s) into the in-memory database (from disk storage) in order to compute the requested aggregate values, or persistently retain the corresponding historical partition(s) in the in-memory database to use for calculating such aggregates, when requested. As noted above, both of these approaches are undesirable.

An alternative would be to have aggregate tables that applications fill actively. However, such an approach could require that all modifying (data modifying) operations (DML statements) of a corresponding database application also constantly update the aggregate tables, which is inefficient. This is how a number of enterprise resource planning (ERP) systems work, or have worked historically. Such implementations usually have a large overhead in their application logic (e.g., including complex aggregation logic), which can significantly reduce the flexibility application developers have to add new features because, at least in part, that complex aggregation logic may have to be modified when adding new features. Therefore, it may be more efficient for application developers to define a view (or views) to get the data they want and have the database system be responsible for building (and caching) aggregates (views) of that data, such as using the approaches described herein.

For instance, in the system 100, aggregates (aggregate values) of data included in historical partitions can be cached in the cache 106, where the cache 106 is managed by the query processor 102. The cache 106 shown in FIG. 1 may store the query results of views (typically aggregates) individually for multiple historical partitions in a table. Examples of such implementations are discussed in further detail below.

As illustrated in FIG. 1, the cache 106 can include one or more query results (e.g., cache entries) that are each based on data included in a respective historical partition (and also correspond with a given view of the associated database table). A cache entry of the cache 106 may also include a build transaction identifier (ID) that indicates a transaction number of a query from which the result (cache entry) was cached in the cache 106 (e.g., where transactions processed by the database 100 are assigned sequential transaction IDs, commit timestamps, or other order identifiers). For instance, if a query received at the query processor 102 requests a query result that has not been previous determined (previously cached), or if a corresponding entry in the cache 106 has been invalidated (e.g., because its corresponding historical partition has been modified since the entry in the cache 106 was generated), the query processor 102 may instruct the query execution engines 108 to execute the query. Once the requested query result is determined, the query processor 102 may create, generate or rebuild the cache 106 or the respective cache entry in the cache 106, and include the determined query result, as well as a build transaction ID corresponding with the transaction number of the corresponding query (that generated the query result) in the newly created or rebuilt cache 106 or cache entry.

In the database 100, the partition update information 108, which, in this example, corresponds with the same historical partition(s) as the cache 106, can be used, in conjunction with the build transaction IDs of the cache 106, to determine if one or more query results (entries) of the cache 106 are valid (e.g., can be provided in response to a query) or invalid (e.g., should be discarded and recalculated or determined). As shown in FIG. 1, the partition update information 108 includes an update transaction ID that indicates a transaction number of a transaction that most recently modified a given historical partition corresponding with an entry in the cache 106. Modifying (e.g., SQL) statements (DML or DML statements), in the database 100, can be processed by the DML processor 120. When a historical partition is being modified, the DML processor 120 can update the partition update info 108 and write the transaction ID of the DML statement that results in such modification as the most-recent transaction that updated the respective partition.

In such an approach, a cache entry in cache 106 will be considered valid (e.g., by the query processor 102) if the build transaction ID of the cache entry in the cache 106 is greater than or equal to the corresponding update transaction ID in the associated partition update information 108. In other words, if the query that is requesting a query result in the cache 106 either causes the corresponding cache entry in cache 106 to be built or created, or if that cache entry in the cache 106 was built after the corresponding historical partition was last modified (based on the comparison of transaction IDs), the cache entry in cache 106 and its query results are considered valid. In comparison, if the build transaction ID of the cache entry in the cache 106 is less than the corresponding update transaction ID in the partition update information 108 (e.g., the cache entry in cache 106 was built before the corresponding historical partition was modified), the cache entry in the cache 106 and/or its query results with the corresponding modified historical partition are considered invalid and should be discarded. Such an approach can be referred to as "lazy invalidation".

In other implementations, the cache 106 (or its entries) could be actively invalidated. In such an approach, if a DML statement is received by the database 100 that results in modification of a historical partition, the database 100, in parallel with the modification of the historical partition, can check for an associated query result (or results) in the cache 106 and, if present, invalidate and/or discard those query result(s) in the cache 106. The cache 106 (e.g., the discarded entries or view results) could then be rebuilt (recreated, regenerated, etc.) immediately after invalidation or, alternatively, could be rebuilt (recreated, regenerated, etc.) in response to a query that requests (or is dependent) on the invalidated cache entry or entries.

In the database 100, the query processor 102 is configured to accept a query string (DQL) and analyze the query string. As part of the analysis, the query processor 102 can determine whether the received query string is a query on a view that supports caching on historical partitions of a partitioned table. If such a view is being requested, the query processor 102 can determine whether cache 106 includes the requested query result and whether that cache entry in the cache 106 is valid or not. If the query processor 102 determines that the cache entry in the cache 106 does exist and is valid, the query processor 102 can simply obtain the requested query result from the cache 106 and provide the query result in response to the query.

Alternatively, if the query processor 102 determines that the query result does not exist in cache 106, has been previously invalidated (in response to modification of a given historical partition), or should be invalidated based on a comparison of a build transaction ID of the entry in the cache 106 and an update transaction ID corresponding with the given historical partition, the query processor 102 can instruct the query execution engines 108 to load the given historical partition corresponding with the query, which can be included on disk-storage of the database 100, from the tables 110, and determine the requested query result. When the requested query result is returned to the query processor 102, a new cache entry in cache 106 can be built (created, generated, recreated, regenerated, and so forth) with a build transaction ID (corresponding with a transaction number of the query being executed). Further, the query processor 102 can return the determined query result (e.g., view of the partitioned table) in response to the query.

Figure 2:
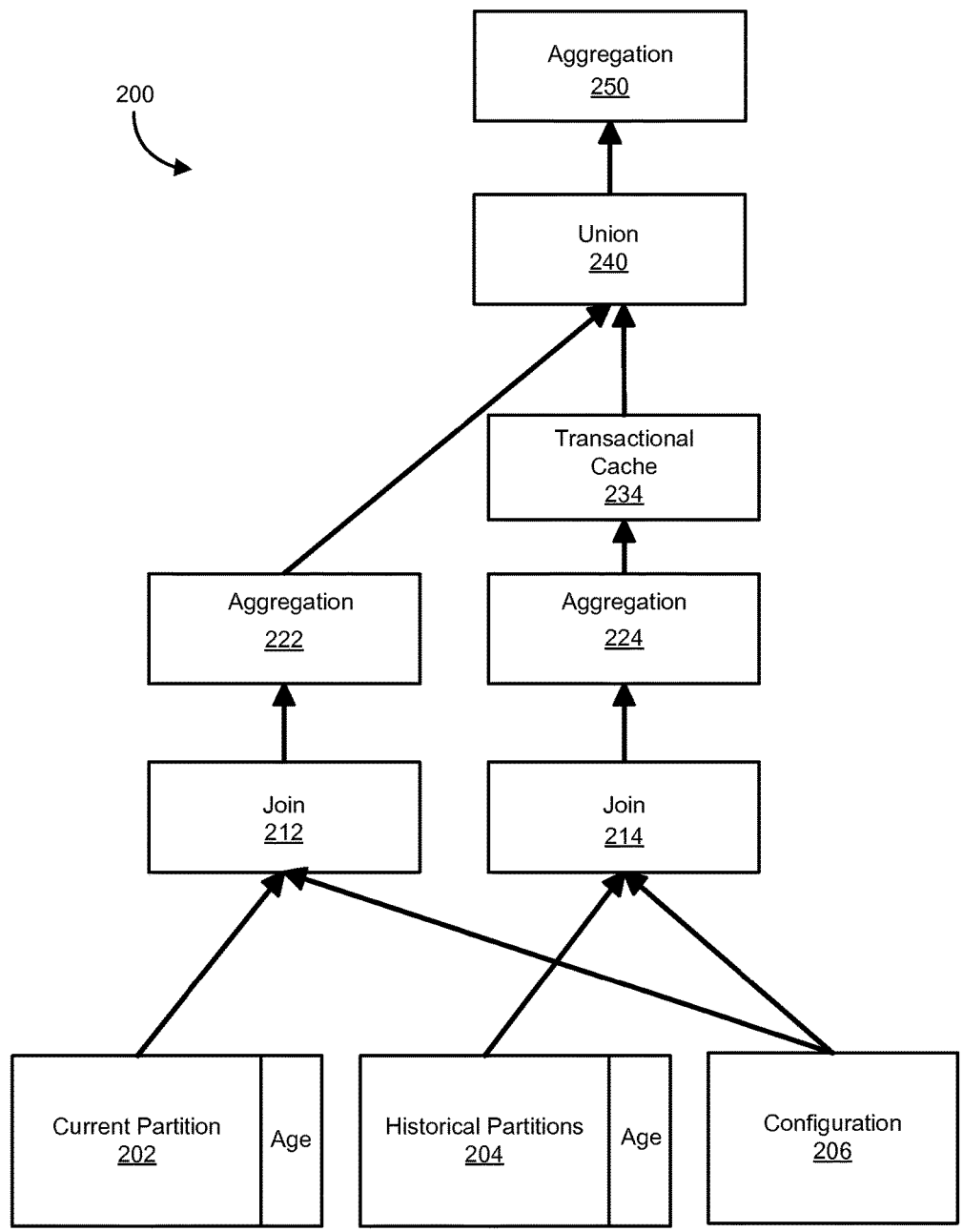
FIG. 2 is a diagram illustrating a model of a design-time view of a partitioned database table, according to an implementation.
Figure 3:
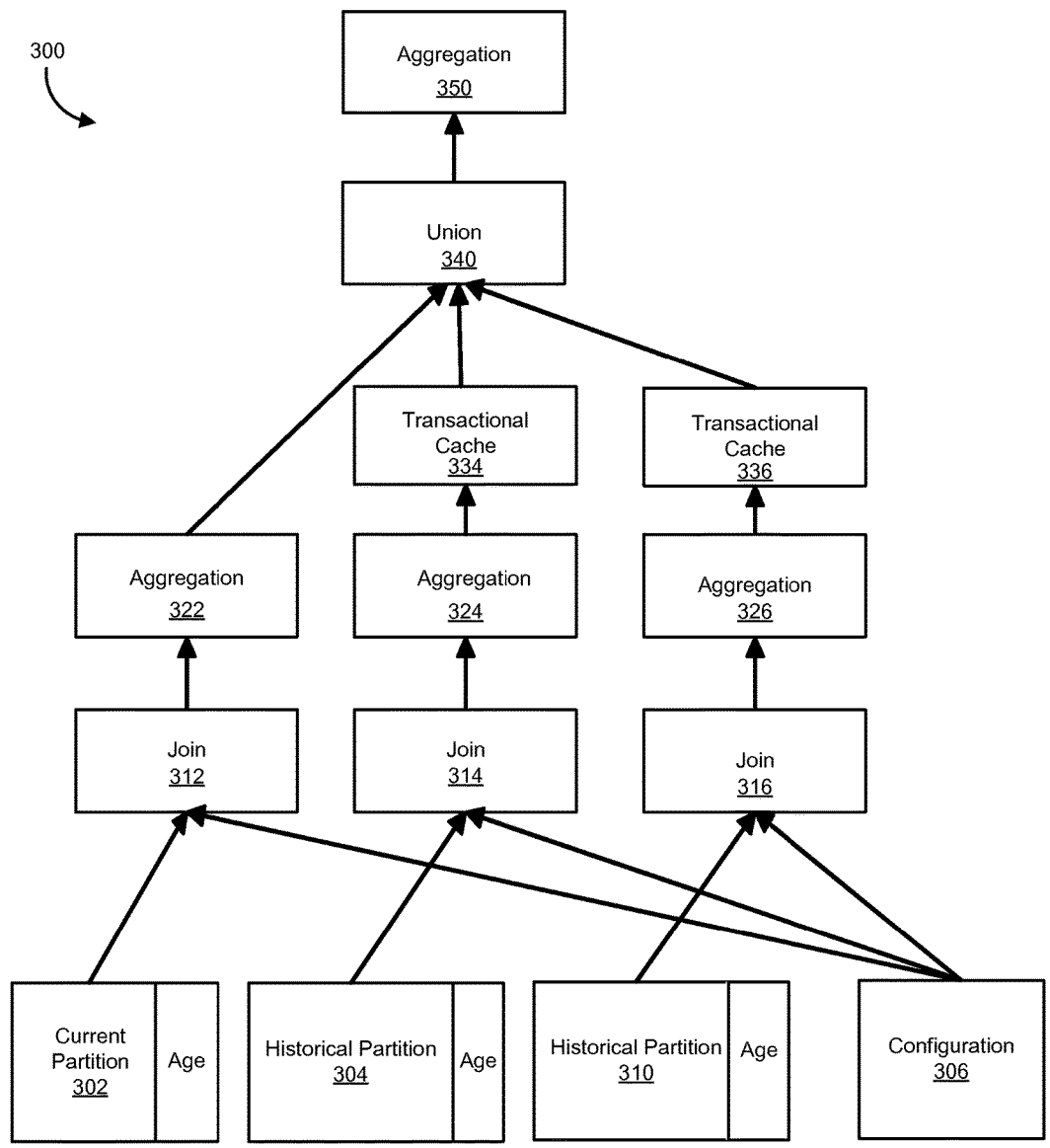
FIG. 3 is a diagram illustrating a model of a run-time view of a partitioned database table according to an implementation.

FIG. 2 is a diagram illustrating a model of a view 200 on a partitioned database table, according to an implementation. The view 200 can be referred to as a design-time view, as it represents a design model of a database view that includes a given partitioned database table with a current partition and a historical partition, which can be replicated at run-time for tables having more than one historical partition. As shown in FIG. 2, the view 200 includes two execution paths. First, the view 200 includes an execution path for a current partition 202, which includes the join operation 212 and the aggregation operation 222. Second, the view 200 of FIG. 2 includes an execution path for historical partitions 204, which includes the join operation 214, the aggregation operation 224 and the transactional (historical) cache generation 234. At run-time, the second execution path can be replicated based on a number of historical partitions that are included in a partitioned table of a corresponding database application. An example of such a run-time view (model), based on the view 200, is illustrated in FIG. 3 and discussed below. Briefly, however, as additional historical partitions are added during run-time, corresponding execution paths can be added to an associated view (model). The view 200 also illustrates merging the execution path of the current partition 202 and the execution path of the historical partitions 204, where this path includes a union operation 240 and an aggregation operation 250.

As shown in FIG. 2, the join operation 212 includes performing a join of the current partition 202 with the configuration information 206. The configuration information 206 may also be referred to as a customizing table that can be used to format and customize how data (of a database), in run-time versions of the view 200, is presented by a corresponding database application. In this example, the configuration information 206 may not be included as part of an aging run for a corresponding partitioned table. Similarly with the join 212, the join operation 214 includes performing a join of a historical partition of the historical partitions 204 with the configuration information 206. As noted above, the path including the join 214 may be replicated in run-time models, based on the view 200, that include more than one historical partition. The joins 212 and 214 in view 200 is an illustration to show that the mechanism is not restricted to accessing only one of the partitioned tables with current and historical partitions. Instead, various commonly known database operations may be performed. Due to the nature of the separation of an execution plan into multiple paths for the current partition 202 and the one or many historical partitions 204, the semantics of the individual database operations should be considered in order to create valid query results. As an example, an outer join operation (rather than an inner join operation) may lead to unexpected (and invalid) query results.

In the view 200, the aggregation operation 222 can be performed on the results of the join 212 and the aggregation operation 224 can be performed on the results of the join 214. The aggregation operations 222, 224 can include determining any aggregates defined in a run-time model based on the view 200 for a given application.

As also shown in FIG. 2, the results of the aggregation operation 224 can be used to build (create, generate, etc.) a transactional (query result/view) cache (e.g., the cached 106 of FIG. 1), or build (create, generate, etc.) an entry in such a cache. In comparison, in the view 200, there is no cache (cache entry) creation operation in the execution path corresponding with the current partition 202. In such approaches, a transactional cache or corresponding cache entries are not built based on the results of the aggregation operation 222, as using such a cache could adversely impact performance of associated database applications. For example, in many implementations, the current partition 202 would typically be loaded into memory modules of the in-memory database. Therefore, a cache of the query results from aggregation operation 222 would be unneeded, as the aggregation operation 222 can be easily repeated in response to modification of the current partition 202, which is typically loaded into the in-memory database and is typically frequently modified.

The view 200 has multiple execution paths that have to be combined in union 240. In the union operation 240, the query results of separate intermediate query results (e.g., cached and/or uncached results) can be combined by merging aggregation results of all input execution paths into a single result set, such as defined in the view 200.

In the view 200, an aggregation operation 250 can be performed on the results of the union operation 240. The aggregation operation 250 can include determining any aggregates from the results of the union operation 240 that are defined in a run-time model based on the view 200 for a given database application. In other implementations, such a post-union aggregation operation 250 can be omitted. That is, performance of the aggregation operation 250 can be based on the particular application (e.g., view) and/or the semantics of a corresponding table and/or query.

FIG. 3 is a diagram of a run-time partitioned database table view 300, according to an implementation. As noted above, the view 300 in FIG. 3 is a run-time view (model), based on the view (design-time view) 200. For purposes of illustration, the view 300 will be described with further reference to FIGS. 1 and 2, as appropriate.

In such approaches (as in the view 300), a view can be defined on a partitioned table having any number of historical partitions, e.g. one per year. Accordingly, for each view of a given partitioned table, there can be one corresponding cache entry (e.g., in the cache 106) per historical partition of the given table for a given view. Said another away, the cache 106 can include an entry per view per historical partition for a given partitioned database table.

As an example, the database 100 could include a first partitioned table with three historical partitions and two views defined on the first table. In this example, the database 100 can also include a second partitioned table with three historical partitions with one view defined on the second table. Further in this example, the cache 106 of the database 100 could include nine total cache entries, six entries for the first table (three for the first view, one entry for each of the first table's historical partitions, and three entries for the second view, one entry for each of the first table's historical partitions) and three entries for the second table (one entry for each of the second table's three historical partitions for the single view).

By way of a further example that could be implemented by the view 300 (or a similar view with additional execution paths for additional historical partitions), a partitioned database table (e.g., a table including financial information) that is partitioned by year is considered. For instance, such a table may include a current partition for the calendar year 2015 and respective historical partitions for each of a number of previous calendar years. In this example, during the calendar year 2015, updates to the historical partition for 2014 (and potentially to the historical partition for 2013) can occur as a result of DML statements performed as part of a corresponding database application and by aging runs executed on the partitioned table. Accordingly, there can be invalidations of entries in the cache 106 associated with the calendar year 2014 and 2013 historical partitions that occur as a result.

Further in this example, updates (modifications) to partitions of previous years (e.g., previous to the calendar year 2013) are unlikely to occur in response to DML statements or aging runs, or can occur with much less frequency than updates to the historical partitions for 2014 and/or 2013. Accordingly, modifications to one historical partition (e.g., 2014) should only cause the cache entries in the cache 106 corresponding with (e.g., that are based on) the modified historical partition (or partitions) to be invalidated and should not result in invalidation of cache entries of the cache 106 that correspond with (e.g., are based on) other historical partitions (e.g., historical partitions corresponding with calendar years other than 2014). Such operation of the database 100 is desirable, as rebuilding (recreating, regenerating) cache entries corresponding with unmodified historical partitions would involve loading each of those partitions into memory, which is unnecessary (and inefficient) as any cache entries (e.g., in the cache 106) associated with unmodified historical partitions would still be valid.

Depending on the particular implementation, historical partitions having different granularities (e.g., other than one historical partition per year) can be implemented (such as in the view 300). Accordingly, the range boundaries for historical partitions (and current partitions) can depend on the specific implementation. Furthermore, in some implementations, new partitions can be added prospectively. For instance, in the example above, a calendar year 2016 partition and/or a calendar year 2017 partition could be added during the calendar year 2015.

Additionally, archiving can be performed on the database 100, which, in some instances, can result in older historical partitions being removed from a corresponding partitioned database table, e.g., when those partitions become empty. Accordingly, developers of database applications cannot reasonably foresee how many and/or which historical partitions may be included in a given table view (implementation). Using the approaches described herein, application developers can model views, such as the view 200 of FIG. 2, that contain a generic execution path for all historical partitions. That generic execution path can then by replicated to implement respective execution paths for each historical partition in a run-time implementation of the modeled view (e.g., the view 300 in FIG. 3). For instance, when the run-time view 300 is created in the database 100, the database 100 can take the number of existing historical partitions (e.g., two in this example) into consideration and then multiply (replicate) the generic execution path for historical partitions (e.g. in the view 200) for each of the historical partitions (e.g., two in the view 300).

Further with respect to the relationship of the view 200 in FIG. 2 and the view 300 in FIG. 3, in FIG. 2 there is only the generic historical partition 204 and the corresponding execution path composed of join 214, aggregation 224 and the transactional cache node 234. In comparison, the view 300 in FIG. 3 illustrates a run-time version of the view 200. In a given implementation of this example, as shown in FIG. 3, the view 300 includes two historical partitions 304 and 310. In this implementation, the database 100 generates respective execution paths for each of the historical partitions 304 and 310. Specifically, in the view 300, there is one execution path for the historical partition 304 that includes a join operation 314, an aggregation operation 324 and a transactional cache node operation 334. The view 300 also includes a second execution path for the historical partition 320 that includes a join operation 316, an aggregation operation 326 and a transactional cache node operation 336. In like manner as the view 200, the view 300 also includes an execution path for the current partition 302 that includes a join operation 312 and an aggregation operation 322. The results of the three execution paths in the view 300 can be merged using a union operation 340, while post-union aggregation can be performed by an aggregation operation 350.

In this example, an implementation of the transactional cache node operations 334 and 336 can include building a cache, such as the cache 106, which can include creating a table for the cache 106, creating (recreating) and inserting entries in the cache 106, invalidating and/or discarding entries in the cache 106, and so forth. Further in the view 300, the two execution paths for the historical partitions 304 and 310 (results of those paths) can be combined using a union operation 340. Post-union aggregation, in the view 300, can then be performed by an aggregation operation 350.

In approaches such as those illustrated by the view 300, upon re-partitioning (e.g., changing partition boundaries of existing partitions) of a table corresponding with the view 300, the entire view 300, its execution paths and its cache 106 would be rebuilt. In comparison, adding or removing individual historical partitions of an existing view (e.g., removing the historical partition 310 from the table corresponding with the view 300) can be done without rebuilding the previously existing execution paths and corresponding entries in the cache 106. That is, the view 300 would instead be updated to contain additional or fewer execution paths, including adding or removing corresponding cache entries (e.g., using the approaches described herein, based on the added or dropped partitions, without invalidating existing cache entries of other previously existing historical partitions.

Figure 4:
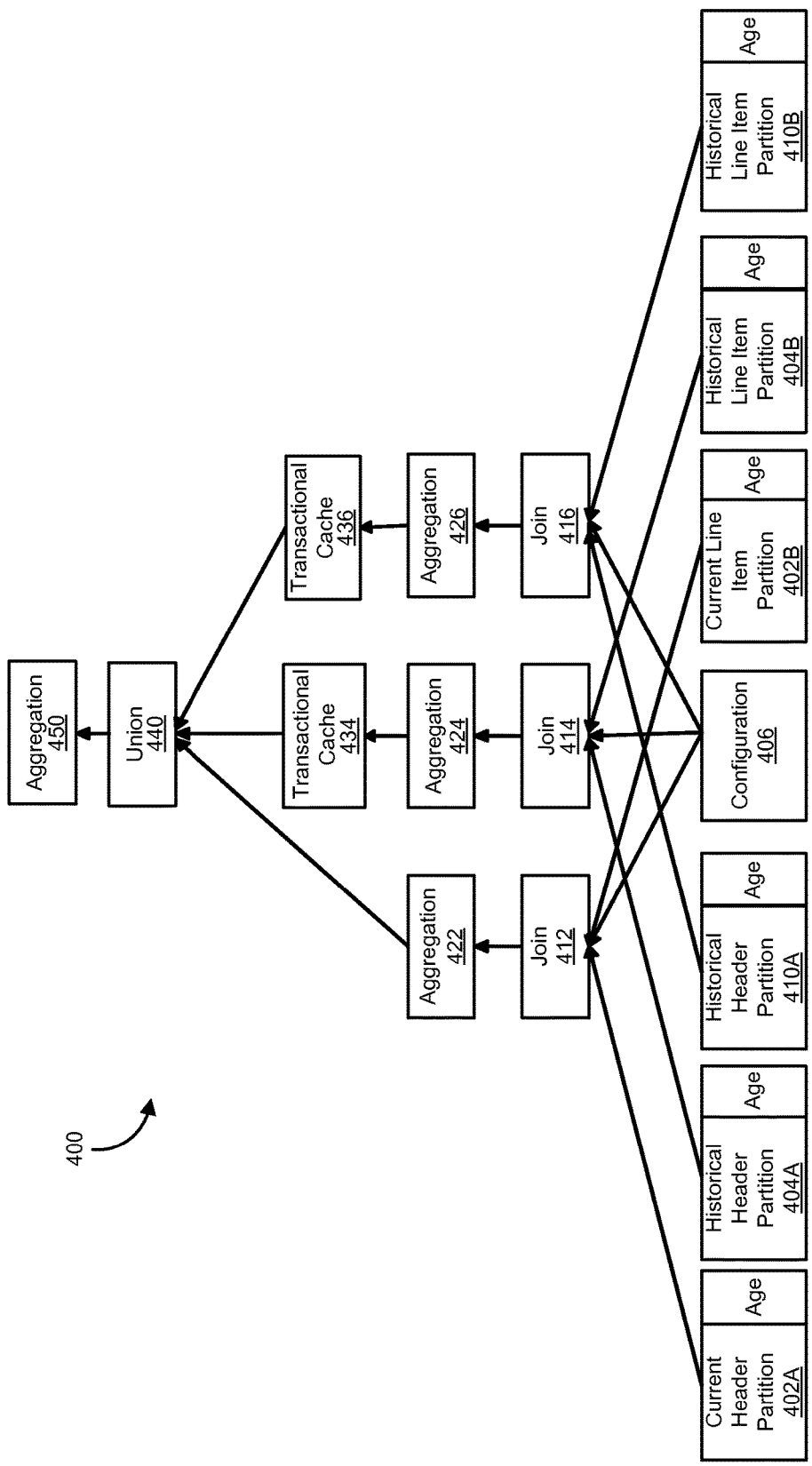
FIG. 4 is a diagram illustrating a model of another run-time view of a partitioned database table, according to an implementation.

FIG. 4 is a diagram of another run-time partitioned database table view 400, according to an implementation. The view 400 illustrates an example of a more complex run-time view, that includes joining two individual tables, both with current and historical partitions, and a single configuration table 306. In this example, the partitioned tables can include a header table and a lineitem table. The header table can include a current partition 402A, a historical partition 404A and a historical partition 410A. Similarly, the line item table can include a current partition 402B, a historical partition 404B and a historical partition 410B. In this example the header and line item tables can belong to a same business object, or a set of related tables.

In order to maintain consistency (semantic consistency) between the header table and the line item table of the view 400, the corresponding partitions of both of those tables should have the same range boundaries. Typically, application developers define foreign key relationships among such related tables to enforce consistency checks among related rows. As an example, the header and lineitem tables (e.g., when combined by an inner join) can be a representation of sales orders for a business. In such an approach, the data lifecycle of data objects included in the header and lineitem tables can be managed by a corresponding database application. In such implementations, when a given data object is closed and an aging run (as discussed herein) then moves the given object to its corresponding header and lineitem historical partitions, it sets the age or temperature of corresponding rows of the component parts of the given object (e.g. a sales order), in the header and lineitem tables, to a same value. This approach, even though the object is spread over two partitions, results in the corresponding rows of the given data object in the current header partition 402A and the current lineitem partition 402B (e.g., during an aging run) being relocated (moved) into respective header and lineitem historical partitions, such that semantic consistency of the given data object is maintained.

As an example of the above approach, consider a data object representing a sales order that is set to be closed (was closed) on the $15^{th}$ of May 2014. This data object, in this example, can include a header row in the current header partition 402A and a lineitem row in the current lineitem partition 402B. For purposes of this example, it is assumed that the historical partitions of both tables (header and lineitem) have the same range boundaries, there is one historical header partition per year and there is one lineitem historical partition per year (corresponding respectively with each of the historical header partitions). In such an arrangement, during an aging run that moves the $15^{th}$ of May 2014 sales order data object, the corresponding header and lineitem rows of that object will each be moved to respective header and lineitem 2014 historical partitions. Since the ranges of that corresponding historical partitions in such approaches are identical, and since the aging run moves objects as a whole and sets the age or temperature value to the same value, it would be semantically correct to perform an inner join between the two tables and still provide correct query results. The previously described technique of replicating execution paths (e.g., such as described with respect to the generic historical partition execution path of the view 200 and the corresponding run-time view 300) still yields correct (semantically consistent) results, even when implementing more complex database operations or view definitions. When implementing such approaches, an application developer should be aware of the corresponding semantics of the aging run (e.g., the application developer should know which tables or business objects the aging run treats as a unit).

In the view 400, there are three execution paths shown, one execution path for the current header partition 402A and the current header partition 402B, and two identical execution paths for each of the related pairs of historical partitions (e.g., one execution path for the header historical partition 404A and the lineitem historical partition 404B, and a second execution path for the header historical partition 410A and the lineitem historical partition 410B).

As shown in FIG. 4, for the view 400, an execution path for the header current partition 402A, the current lineitem partition 402B and a configuration table 406 includes a join operation 412 and an aggregation operation 422. The view 400 of FIG. 4 also includes an execution path for the header historical partition 404A, the lineitem historical partition 404B and the configuration table 406, which includes a join operation 414, an aggregation operation 424 and a transactional (historical) cache generation operation 434. The view 400 of FIG. 4 further includes an execution path for the header historical partition 410A, the lineitem historical partition 410B and the configuration table 406, which includes a join operation 416, an aggregation operation 426 and a transactional (historical) cache generation operation 436. The result of these execution paths can be merged using a union operation 440 and post-union aggregation can be performed by an aggregation operation 450.

When a database application adds new partitions (e.g., automatically) for upcoming periods, or if an administrator adds new historical partitions manually to tables that are joined in such a view (e.g., as in the view 400) with cache nodes, the database system can check whether all corresponding partitions of all involved tables have the same ranges. If they do not, it is not possible to multiply the execution paths in the previously described manner and produce semantically correct results. In such situations, caching for a corresponding view can be disabled and an alert can be generated for a database administrator.

Figure 5:
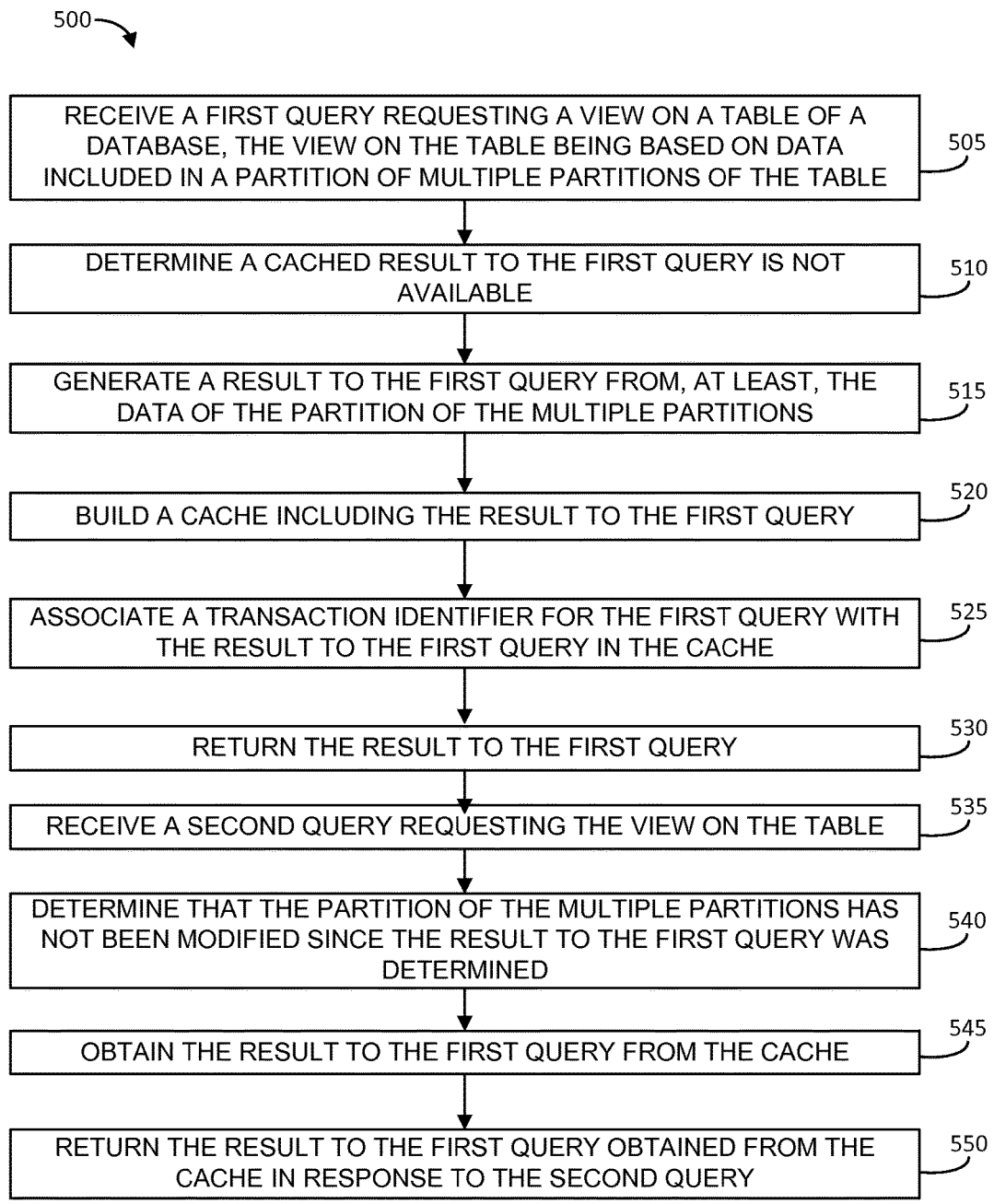
FIG. 5 is flowchart illustrating a method for caching aggregation views on historical data included in a partitioned table, according to an implementation.
Figure 6:
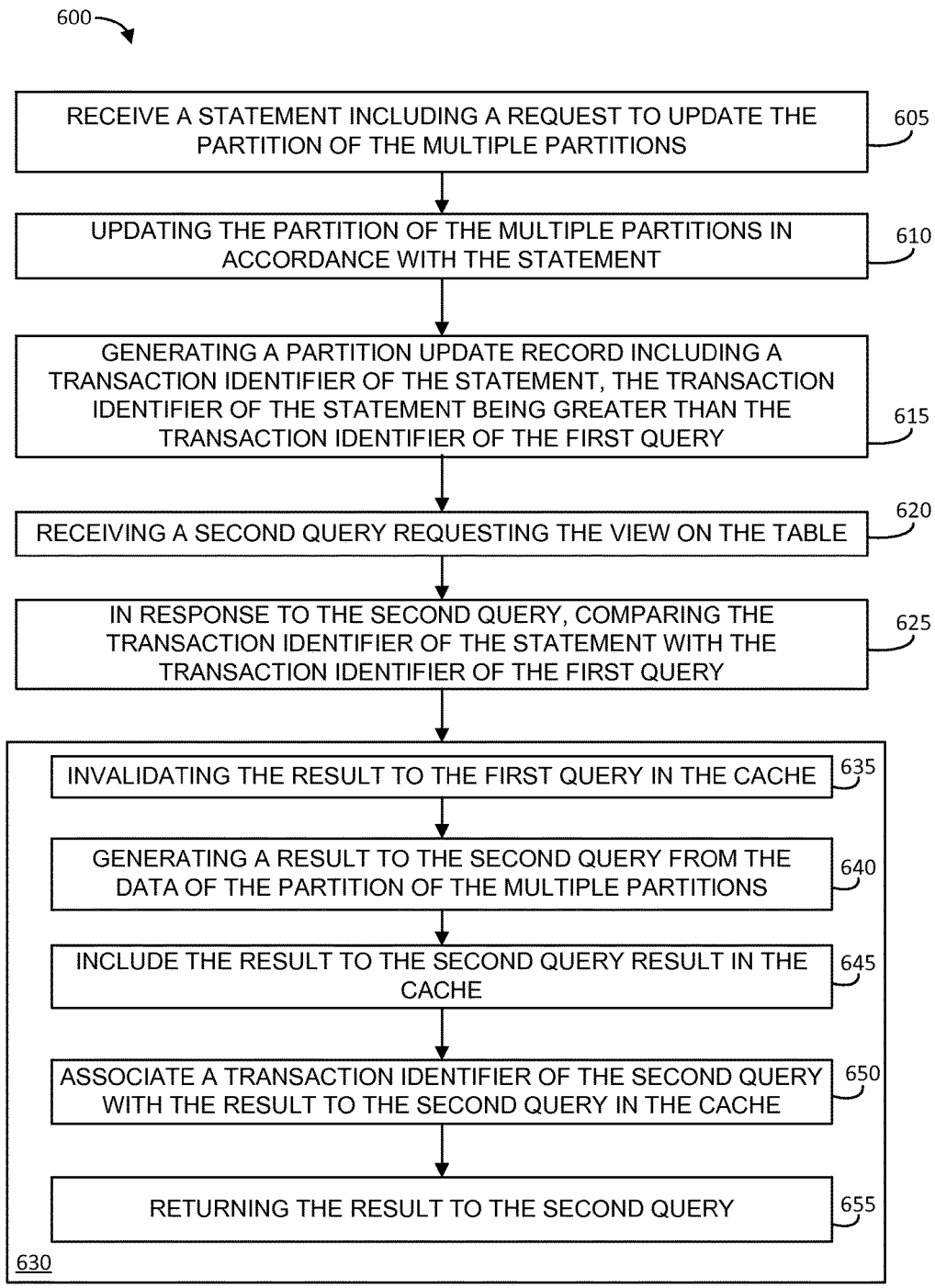
FIG. 6 is flowchart illustrating another method for caching aggregation views on historical data included in a partitioned table, according to an implementation.
Figure 7:
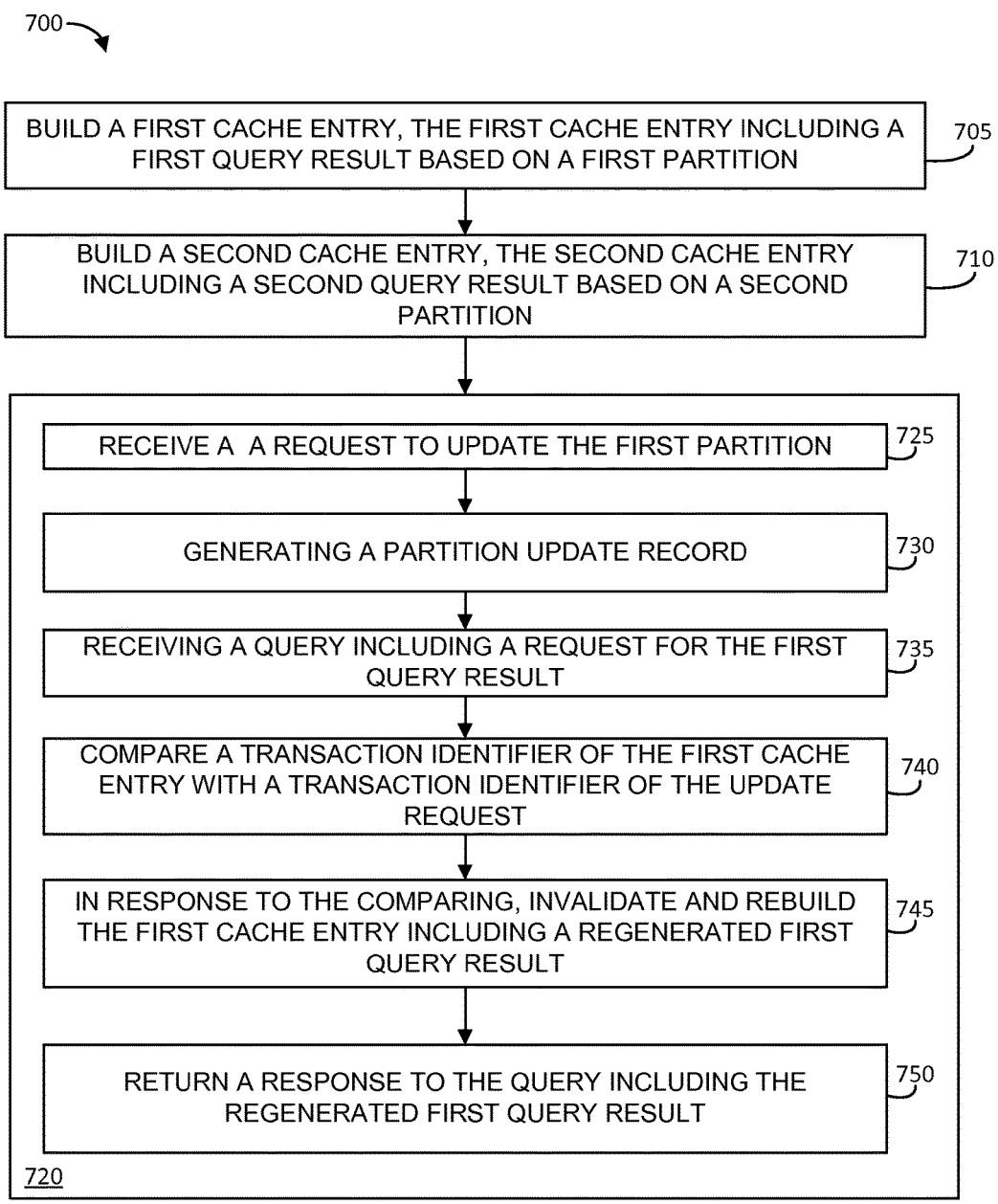
FIG. 7 is flowchart illustrating yet another method for caching aggregation views on historical data included in a partitioned table, according to an implementation.

FIGS. 5, 6 and 7 are flowcharts illustrating example methods for executing queries on a table of a database, where the table has multiple partitions (e.g., including one or more historical partitions). The methods illustrated in FIGS. 5, 6, and 7 are given by way of example and for purposes of illustration. The methods of FIGS. 5, 6, and 7 can be implemented alone, or in conjunction with one another, as appropriate. In some implementations, one or more operations of the methods illustrated in FIGS. 5, 6, and 7 can be omitted and/or one or more other operations can be added. For instance, additional queries on and/or updates to partitions of a database table can be performed using similar operations as those illustrated in FIGS. 5, 6, and 7. The specific operations included in a method for executing queries on a table of a database can depend on the particular database implementation, the structure of one or more corresponding database tables, and so forth. The example methods of FIGS. 5, 6, and 7 (and other such methods) can be implemented in the database 100 of FIG. 1 using the techniques for caching query results described herein. Accordingly, for purposes of illustration, the example methods of FIGS. 5, 6, and 7 will described with further reference to other figures of the drawings, as appropriate.

FIG. 5 is a flowchart illustrating an example method 500 for executing queries on a table of a database (e.g., the database 100), where the table has multiple partitions (e.g., as in the views 300 and 400). The method 500 includes, at block 505, receiving a first query (e.g., at the query processor 102), where the first query includes a request for a view on the table, the view on the table being based on data included in a partition of the multiple partitions of the table. At block 510, the method 500 includes determining that a cached result to the first query is not available in the database (e.g., in the cache 106). The operation at block 510 may include determining that the cache 106 has not yet been created, that an entry with a result to the first query has not yet been cached, or that a result to the first query in the cache 106 is invalid (e.g., based on a comparison of transaction identifiers, such as described herein).

At block 515 (e.g., in response to the determination at block 510), the method 500 includes generating a result to the first query (e.g., by the query execution engines 104) from (based on), at least, the data of the partition of the multiple partitions. After the generating at block 515, the method 500 includes, at block 520, building a cache including the result to the first query. The building operation at block 520, e.g., in the database 100, can include creating the cache 106 with the entry for the result to the first query, or can include adding the entry for the result to the first query to the cache 106, if the cache 106 was previously created. At block 525, the method 500 includes associating a transaction identifier (e.g., a sequential transaction identifier) for the first query with the result to the first query in the cache 106. At block 530, the method 500 includes returning, e.g., by the query processor 102, the result to the first query.

At block 535, the method 500 includes receiving a second query requesting the view on the table (e.g., the view of the first query). At block 540, the method 500 includes obtaining the result to the first query from the cache. As described herein, the query processor 102, when processing the second query can compare a transaction identifier for the first query with a transaction identifier corresponding with a last update to the partition of the multiple partitions and, based on that comparison, determine that the transaction identifier for the first query is greater than or equal to the transaction identifier corresponding with the last update to the partition of the multiple partitions, indicating the result to the first query in the cache 106 is valid. The method 500 further includes, at block 545, obtaining the (valid) result to the first query from the cache 106 and, at block 550, returning the result to the first query obtained from the cache 106 in response to the second query.

FIG. 6 is a flowchart illustrating another example method 600 for executing queries on a table of a database (e.g., the database 100), where the table has multiple partitions. In example implementations, the method 600 can be implemented in conjunction with the method 500 of FIG. 5. For purpose of illustration, the method 600 is described as being implemented after (subsequent to) the method 500 and with reference to the other figures of the drawings, as appropriate.

At block 605, the method 600 includes receiving a statement (e.g., a DML statement at the DML processor 120) including a request to update the partition of the multiple partitions of the table. At block 610, the method 600 includes updating the partition of the multiple partitions in accordance with the statement of block 605. At block 615, the method 600 includes generating a partition update record, e.g., in the partition update information 108, including a transaction identifier (e.g., sequential transaction identifier) of the statement of block 605. The transaction identifier of the statement, in this example, is greater than the transaction identifier of the first query (e.g., indicating a later commit time for the statement than a commit time for the first query). At block 620, the method 600 includes receiving a second query requesting the view on the table. At block 625, in response to the second query of block 620, the method 600 includes comparing the transaction identifier of the statement with the transaction identifier of the first query.

In the method 600, the operations included in the block 630 can occur in response the comparing operation of block 625, and are described as such. At block 635, the method 600 includes invalidating the result to the first query in the cache 106. At block 640, the method 600 includes generating a result to the second query from the data of the partition of the multiple partitions and, at block 645, including the result to the second query result in the cache 106. The method 600 further includes, at block 650, associating a transaction identifier of the second query with the result to the second query in the cache 106 and, at block 655, returning the result to the second query.

As noted above, additional queries on the table of the method 600, and/or updates to the partitions of that table can occur using operations such as those described herein. For instance, after the operations of the method 600, a third query requesting the view on the table can be received. In response to the third query, the transaction identifier of the second query can be compared with the transaction identifier of the (DML) statement (e.g., to determine that the result to the second query in the cache 106 is valid) and, in response to the comparing, the result to the second query in the cache 106 can be returned in response to the third query. Similarly, further modifications to partitions of the table of the method 600 can also be performed using similar operations as those of blocks 635 through 650.

In the methods 500 and 600, the partition of the multiple partitions of the table can include a historical partition. Further, the database of the methods 500 and 600 can include an in-memory database. The partition of the multiple partitions can be stored on disk-based storage and generating the results to the first query and the second query can include loading (for each query) the partition of the multiple partitions from the disk-based storage into the in-memory database.

FIG. 7 is a flowchart illustrating yet another example method 700 for executing queries on a table of a database, where the table has multiple partitions. As with the methods 500 and 600, the method 700 can be implemented in conjunction with other operations and processes, such as those included in the FIGS. 5 and 6. In other instances, other operations can be included in the method 700 and/or operations of the method 700 can be omitted. For purposes of illustration, the method 700 is described with reference to the other figures of the drawings, as appropriate.

The method 700 includes, at block 705, building a first cache entry, where the first cache entry includes a first query result of a view on the table. The first cache entry can also include a first transaction identifier corresponding with the building of the first cache entry. The first cache entry can be based on data of a first partition of the multiple partitions. At block 710, the method 700 includes building a second cache entry, where the second cache entry includes a second query result of the view on the table. The second cache entry can also include a second transaction identifier corresponding with the building of the second cache entry. The second cache entry can be based on data of a second partition of the multiple partitions.

In the method 700, the operations included in the block 720 can occur after the building of the first cache entry at block 705, and are described as such. At block 725, the method 700 includes receiving a statement (DML statement) including a request to update the first partition. At block 730, the method 700 includes generating a partition update record (e.g., in the partition update information 108) including a third transaction identifier corresponding with the statement, where the third transaction identifier is greater (e.g., has a later commit time) than the first transaction identifier. At block 735, the method 700 includes receiving a query including a request for the first query result. At block 740, the first transaction identifier is compared with the third transaction identifier, which indicates that the first query result in the cache 106 is invalid. In response to the comparing at block 740, the method 700 includes, at block 745, invalidating and rebuilding the first cache entry including a regenerated first query result. At block 750, the method 700 includes returning a response to the query including the regenerated first query result.

As discussed above with respect to FIG. 6, additional queries on the table of the method 700, and/or updates to the partitions of that table can occur using operations such as those described herein. For instance, after the operations of the method 700, another (second) query including a request for the second query result can be received. After the second query is received, the second transaction identifier can be compared with a fourth transaction identifier corresponding with a most recent modification of the second partition. In this example, the fourth transaction identifier is less than the second transaction identifier, indicating an earlier commit time for the fourth transaction identifier than a commit time for the second transaction identifier. In response to the comparing the second transaction identifier to the fourth transaction identifier (which indicates the second query result in the cache 106 is valid), a response to the second query including the second query result from the second cache entry can be returned.

The first partition of the table in the method 700 can include a first historical partition and the second partition can include a second historical partition. The database of the method 700 can include an in-memory database. The first partition and the second partition of the table in the method 700 can be stored on disk-based storage. Generating the first query result of the first cache entry of block 705 can include loading the first partition into the in-memory database. Generating the second query result of the second cache entry of block 710 can include loading the second partition into the in-memory database. Generating the regenerated first query result of the rebuilt first cache entry of block 745 can include reloading the modified first partition into the in-memory database.

In a general aspect, a computer-implemented method for executing a query on a table of a database, where the table has multiple partitions, can include receiving a query requesting a view on the table, the view on the table being based on data included in a partition of the multiple partitions of the table. The method can also include determining a cached result to the query is not available in the database and generating a result to the query from, at least, the data of the partition of the multiple partitions. After generating the result to the query, the method can further include building a cache including the result to the query, associating a transaction identifier for the query with the result to the query in the cache and returning the result to the query.

Implementations may include one or more of the following features. For example, the partition of the multiple partitions of the table can include a historical partition. The query can be a first query, and the method can include receiving a second query requesting the view on the table, obtaining the result to the first query from the cache and returning the result to the first query obtained from the cache in response to the second query. Prior to obtaining the result to the first query from the cache, the method can include comparing the transaction identifier for the second query with a transaction identifier corresponding with a last update to the partition of the multiple partitions and determining that the transaction identifier for the second query is greater than or equal to the transaction identifier corresponding with the last update to the partition of the multiple partitions.

The query can be a first query and the method can include: receiving a statement including a request to update the partition of the multiple partitions; updating the partition of the multiple partitions in accordance with the statement; generating a partition update record including a transaction identifier of the statement, the transaction identifier of the statement being greater than the transaction identifier of the first query; and receiving a second query requesting the view on the table. In response to the second query, the method can include comparing the transaction identifier of the statement with the transaction identifier of the first query. In response to the comparing, the method can include: invalidating the result to the first query in the cache; generating a result to the second query from the data of the partition of the multiple partitions; including the result to the second query result in the cache; associating a transaction identifier of the second query with the result to the second query in the cache; and returning the result to the second query. The method can include receiving a third query requesting the view on the table. In response to the third query, the method can include comparing the transaction identifier of the second query with the transaction identifier of the statement. In response to the comparing, the method can include returning the result to the second query from the cache in response to the third query The database can include an in-memory database. The partition of the multiple partitions can be stored on disk-based storage. Generating the result to the query can include loading the partition of the multiple partitions from the disk-based storage into the in-memory database.

In another general aspect, a computer-implemented method for executing queries on a table of a database, where the table has multiple partitions, can include building a first cache entry, the first cache entry including a first query result of a view on the table and a first transaction identifier corresponding with the building of the first cache entry, the first cache entry being based on data of a first partition of the multiple partitions. The method can also include building a second cache entry, the second cache entry including a second query result of the view on the table and a second transaction identifier corresponding with the building of the second cache entry, the second cache entry being based on data of a second partition of the multiple partitions. After building the first cache entry, the method can include: receiving a statement including a request to update the first partition and generating a partition update record including a third transaction identifier corresponding with the statement, the third transaction identifier being greater than the first transaction identifier; receiving a query including a request for the first query result; and comparing the first transaction identifier with the third transaction identifier. In response to the comparing, the method can include invalidating and rebuilding the first cache entry including a regenerated first query result. The method can further include returning a response to the query including the regenerated first query result.

Implementations may include one or more of the following features. For example, the first partition can include a first historical partition and the second partition can include a second historical partition. The query can be a first query, and the method can include: receiving a second query including a request for the second query result; comparing the second transaction identifier with a fourth transaction identifier corresponding with a most recent modification of the second partition, the fourth transaction identifier being less than the second transaction identifier; and, in response to the comparing the second transaction identifier to the fourth transaction identifier, returning a response to the second query including the second query result from the second cache entry.

The database can include an in-memory database. The first partition and the second partition can be stored on disk-based storage. Generating the first query result of the first cache entry can include loading the first partition into the in-memory database. Generating the second query result of the second cache entry can include loading the second partition into the in-memory database. Generating the regenerated first query result of the rebuilt first cache entry can include reloading the modified first partition into the in-memory database.

In another general aspect, a system for executing queries on one or more database tables can include a database including a table having multiple partitions. The database can further include memory modules storing one or more of the multiple partitions of the table, a disk-based storage device storing one or more of the multiple partitions of the table and a query processor. The query processor can be configured to build a first cache entry and a second cache entry. The first cache entry can include a first query result of a view on the table and a first transaction identifier corresponding with the building of the first cache entry. The first cache entry can be based on data of a first partition of the multiple partitions. The second cache entry can include a second query result of the view on the table and a second transaction identifier corresponding with the building of the second cache entry. The second cache entry can be based on data of a second partition of the multiple partitions.

The system can also comprise a data manipulation language (DML) processor that is configured to, after the query processor builds the first cache entry, receive a statement including a request to update the first partition and generate a partition update record including a third transaction identifier corresponding with the statement, the third transaction identifier being greater than the first transaction identifier. The query processor can be further configured to receive a query including a request for the first query result and compare the first transaction identifier with the third transaction identifier. In response to the comparing, the query processor can be configured to invalidate and rebuild the first cache entry including a regenerated first query result and return a response to the query including the regenerated first query result.

Implementations may include one or more of the following features. For example, the first partition can include a first historical partition and the second partition can include a second historical partition. The query can being a first query, and the query processor can be configured to: receive a second query including a request for the second query result; compare the second transaction identifier with a fourth transaction identifier corresponding with a most recent modification of the second partition, the fourth transaction identifier being less than the second transaction identifier; and, in response to the comparing the second transaction identifier to the fourth transaction identifier, return a response to the second query including the second query result from the second cache entry.

The database can include an in-memory database. The first partition and the second partition can be stored on the disk-based storage device. Generating the first query result of the first cache entry can include loading the first partition into the in-memory database. Generating the second query result of the second cache entry can include loading the second partition into the in-memory database. Generating the regenerated first query result of the rebuilt first cache entry can include reloading the modified first partition into the in-memory database.

The query processor can include an SQL processor. The query processor and the DML processor can be included in a single processor. The single processor can include an SQL processor.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for executing queries on a table of a database, the table having multiple partitions, the method comprising:
    building, by a computer, a first cache entry, the first cache entry in a memory including a first query result of a view on the table and a first transaction identifier corresponding with the building of the first cache entry, the first cache entry being based on data of a first partition of the multiple partitions;
    building, by the computer, a second cache entry in the memory, the second cache entry including a second query result of the view on the table and a second transaction identifier corresponding with the building of the second cache entry, the second cache entry being based on data of a second partition of the multiple partitions;
    after the building the first cache entry:
    receiving, by the computer, a data manipulation language statement including a request to update the first partition;
    generating, by the computer, a partition update record including a third transaction identifier corresponding with the data manipulation language statement, the third transaction identifier being greater than the first transaction identifier;
    receiving, by the computer, a query including a request for the first query result;
    comparing, by the computer, the first transaction identifier with the third transaction identifier to determine the third transaction identifier being greater than the first transaction identifier;
    in response to the comparing, invalidating the first cache entry:
    generating, by the computer, a regenerated first query result, wherein the generating of the regenerated first query result further includes reloading the updated first partition into the memory;
    rebuilding, by the computer, the first cache entry including the regenerated first query result; and
    returning, by the computer, a response to the query including the regenerated first query result.

2. The computer-implemented method as in claim 1, wherein the first partition includes a first historical partition and the second partition includes a second historical partition.

3. The computer-implemented method as in claim 1, the query being a first query, the method further comprising:
    receiving a second query including a request for the second query result; comparing the second transaction identifier with a fourth transaction identifier corresponding with a most recent modification of the second partition, the fourth transaction identifier being less than the second transaction identifier; and
    in response to the comparing the second transaction identifier to the fourth transaction identifier, returning a response to the second query including the second query result from the second cache entry.

4. The computer-implemented method as in claim 1, wherein the database includes an in-memory database.

5. The computer-implemented method as in claim 4, wherein:
    the first partition and the second partition are stored on disk-based storage;
    generating the first query result of the first cache entry includes loading the first partition into the in-memory database;

generating the second query result of the second cache entry includes loading the second partition into the in-memory database; and generating the regenerated first query result of the rebuilt first cache entry includes reloading the updated first partition into the in-memory database.

6. A system for executing queries on one or more database tables, the system comprising:
- a memory;
- a database including a table having multiple partitions, the database further including: memory modules storing one or more of the multiple partitions of the table;
- a disk-based storage device storing one or more of the multiple partitions of the table, and a query processor configured to:
- build a first cache entry, the first cache entry including a first query result of a view on the table and a first transaction identifier corresponding with the building of the first cache entry, the first cache entry being based on data of a first partition of the multiple partitions; and
- build a second cache entry, the second cache entry including a second query result of the view on the table and a second transaction identifier corresponding with the building of the second cache entry, the second cache entry being based on data of a second partition of the multiple partitions;
- a data manipulation language (DML) processor configured to, after the building the first cache entry:
- receive a data manipulation language statement including a request to update the first partition; and
- generate a partition update record including a third transaction identifier corresponding with the data manipulation language statement, the third transaction identifier being greater than the first transaction identifier;
- the query processor being further configured to:
- receive a query including a request for the first query result;
- compare the first transaction identifier with the third transaction identifier to determine the third transaction identifier being greater than the first transaction identifier;
- in response to the comparing; invalidate the first cache entry:
- generate, by the computer, a regenerated first query result, wherein the generating of the regenerated first query result further includes reloading the updated first partition into the memory;
- rebuild the first cache entry including the regenerated first query result; and return a response to the query including the regenerated first query result.

7. The system as in claim 6, wherein the first partition includes a first historical partition and the second partition includes a second historical partition.

8. The system as in claim 6, the query being a first query, the query processor being further configured to:
- receive a second query including a request for the second query result;
- compare the second transaction identifier with a fourth transaction identifier corresponding with a most recent modification of the second partition, the fourth transaction identifier being less than the second transaction identifier; and
- in response to the comparing the second transaction identifier to the fourth transaction identifier, return a response to the second query including the second query result from the second cache entry.

9. The system as in claim 6, wherein the database includes an in memory database.

10. The system as in claim 9, wherein: the first partition and the second partition are stored on the disk-based storage device;
- generating the first query result of the first cache entry includes loading the first partition into the in-memory database;
- generating the second query result of the second cache entry includes loading the second partition into the in-memory database; and
- generating the regenerated first query result of the rebuilt first cache entry includes reloading the updated first partition into the in-memory database.

11. The system as in claim 6, wherein the query processor includes an SOL processor.

12. The system as in claim 6, wherein the query processor and the DML processor are included in a single processor, the single processor including an SQL processor.

* * * * *